July 23, 1946. A. Y. DODGE 2,404,623
TORQUE TRANSMITTING MECHANISM
Filed Feb. 14, 1944 3 Sheets-Sheet 2

Inventor:
Adiel Y. Dodge,
By Dawson, Ooms & Booth,
Attorneys.

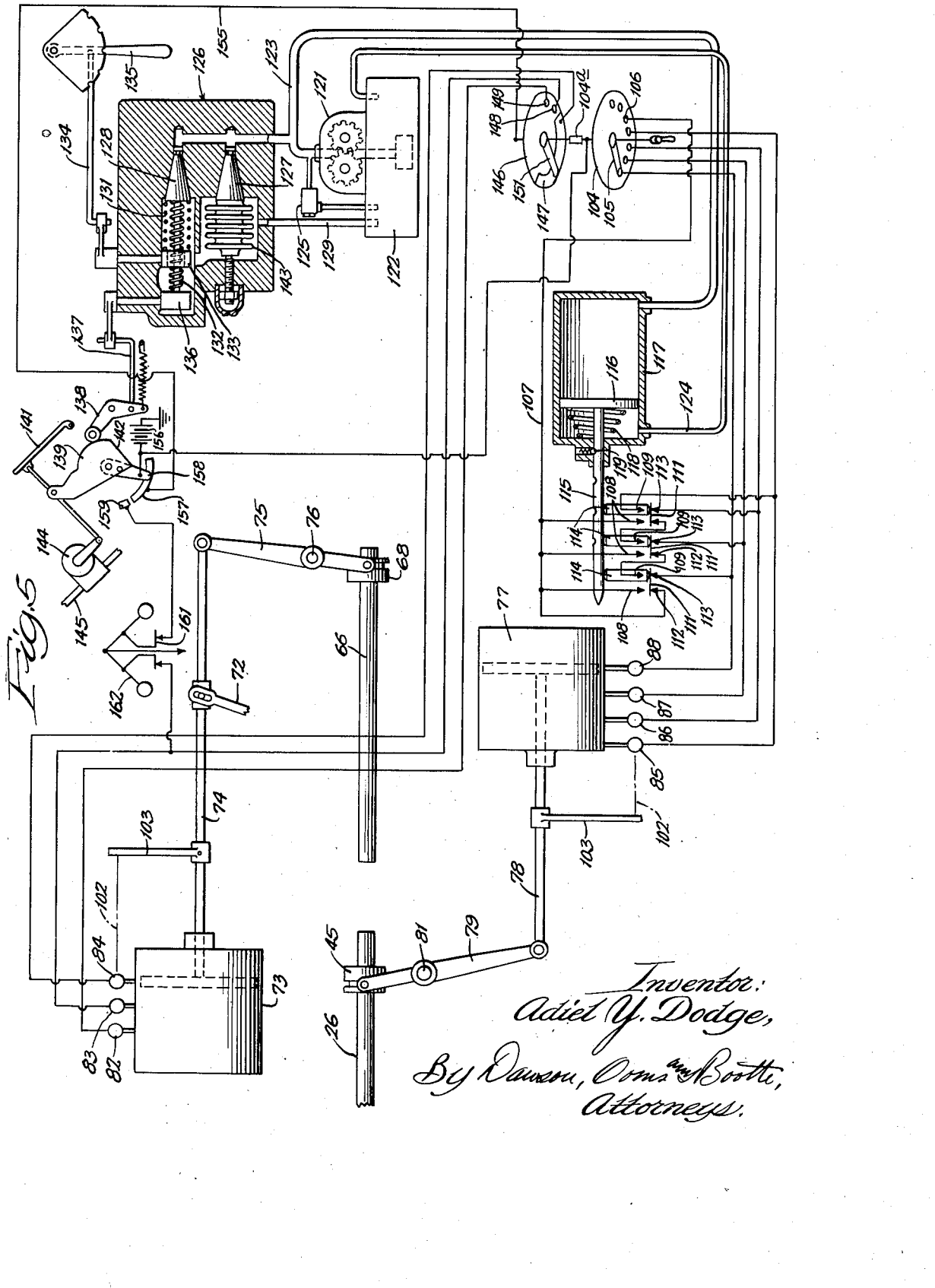

Patented July 23, 1946

2,404,623

UNITED STATES PATENT OFFICE 2,404,623

TORQUE TRANSMITTING MECHANISM

Adiel Y. Dodge, Rockford, Ill.

Application February 14, 1944, Serial No. 522,222

13 Claims. (Cl. 74—293)

1

This invention relates to a torque transmitting mechanism and more particularly to fluid and mechanical transmissions for transmitting torque between driving and driven shafts.

One of the objects of the invention is to provide a torque transmitting mechanism employing a planetary gear set functioning both as a gear reduction unit and as a fluid clutch in which the gears of the gear set are relatively movable for self-alignment. According to one feature of the invention, the ring gear of the planetary set may be supported for axial floating movement to align itself with the planetating gears. According to another feature yielding seals may be provided to seal the sides of the gear teeth against the escape of fluid.

Another object of the invention is to provide a torque transmitting mechanism in which a planetary gear set acts both as a clutch and as a reverse gear.

Still another object of the invention is to provide a torque transmitting mechanism in which torque ratio changes are effected under load, automatically without torque interruption in response to vehicle speed and torque requirements. Preferably a manual control is provided to overrule the automatic control when desired.

A further object of the invention is to provide a torque transmitting mechanism in which torque flow is interrupted under minimum power conditions except when the speed is above a predetermined value.

The above and other objects and advantages will be more readily apparent from the following description when read in connection with the accompanying drawings, in which—

Figure 5 is a diagrammatic view showing the control system.

Figure 1:
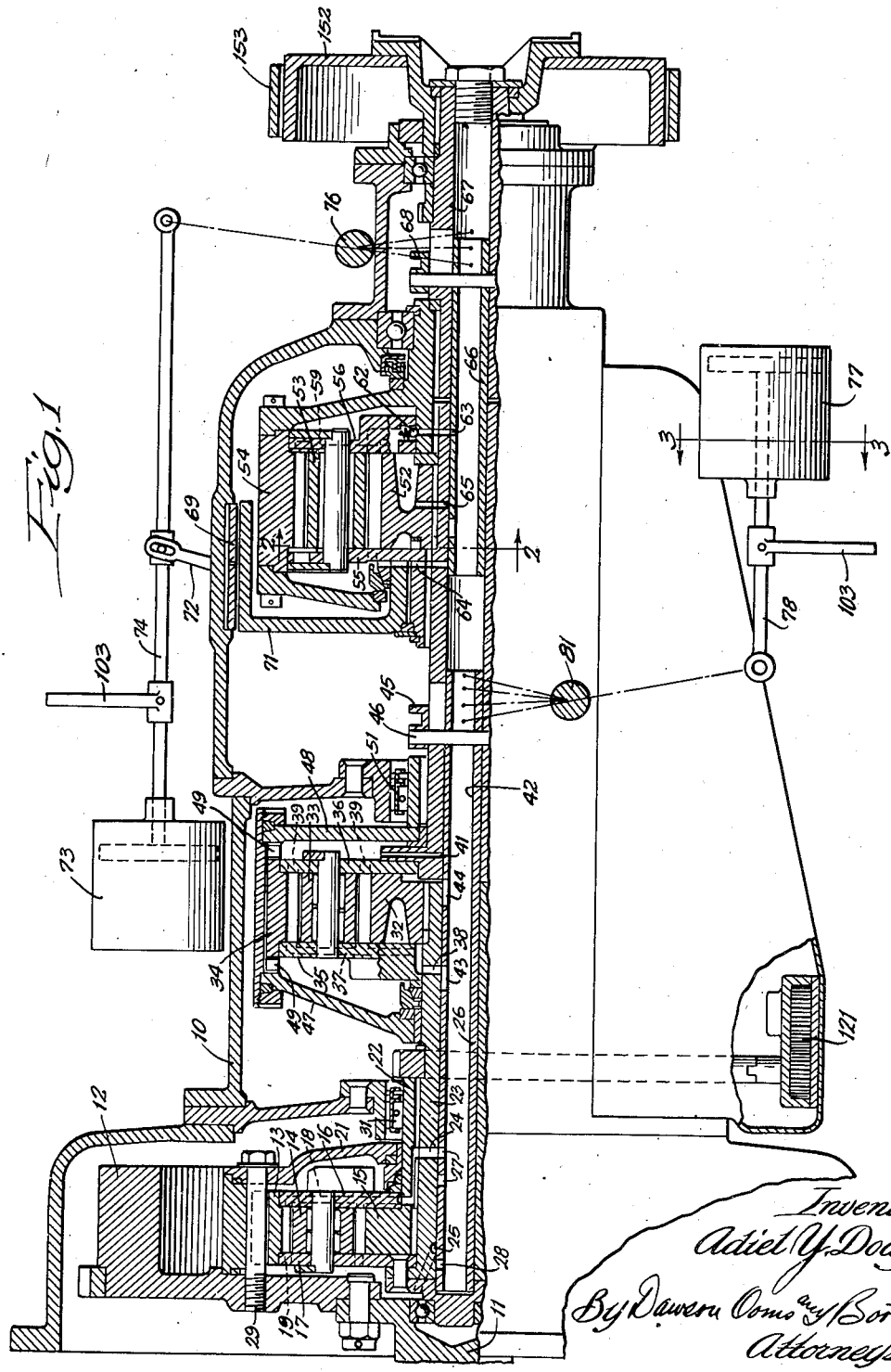
Figure 1 is a side elevation with parts in section of a transmission embodying the invention.
Figure 2:
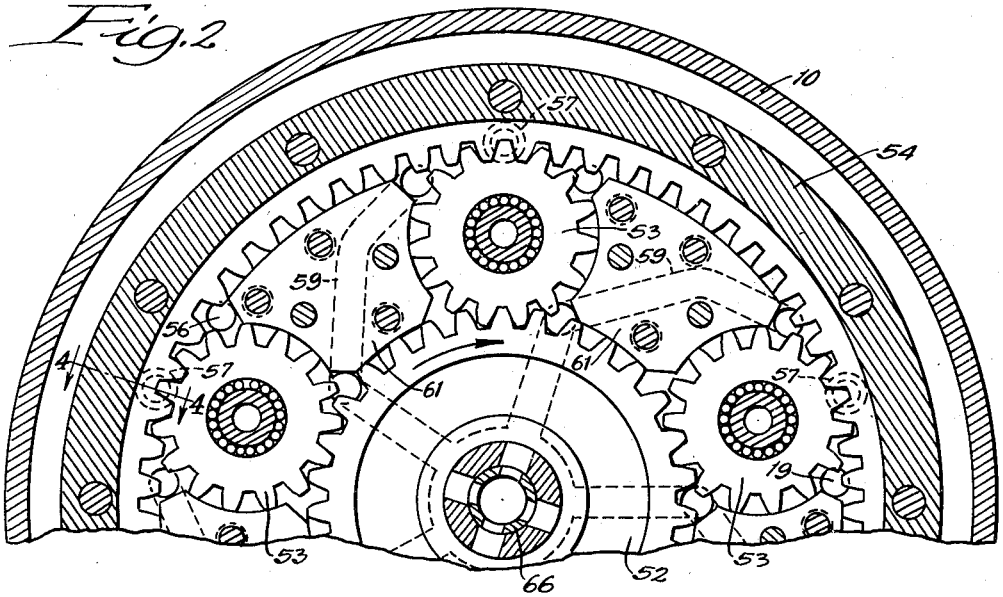
Figure 2 is a partial enlarged section on the line 2—2 of Figure 1.

The transmission as shown in Figures 1 and 2 is substantially similar to that more particularly described in my co-pending application, Serial No. 494,291 filed July 12, 1943, Patent #2,371,229. The transmission as shown, comprises a stationary housing 10 which may be mounted in place of the usual transmission casing in an automobile or the like. A driving shaft 11 which may be the engine crank shaft or a suitable extension

2 thereof, extends into the housing and is connected to a fly wheel 12. The fly wheel is adapted to drive one element of a planetary gear unit including a ring gear 13 meshing with planet pinions 14 which in turn mesh with a sun gear 15. The planet pinions are supported between side plates 16 and 17 forming a gear carrier and which fit tightly against the sides of the teeth on the sun gear, planet pinions and ring gear. The ends of the teeth fit against blocking members so that the unit forms a gear pump having a series of inlet ports 18 in the side plate 16 and outlet ports 19 in the side plates 17 opening into the space around the unit.

The unit is mounted between the flange of the fly wheel 12 and a cover plate 21 which seals against a sleeve 22 on which the sun gear is mounted. Fluid is supplied to the unit through a tubular driven shaft 23 connected to the side plates and formed with an inlet port 24 communicating with the inlet passage 18. The shaft 23 is also formed with an exhaust port 25 communicating with the space around the gear set. The ports 24 and 25 are controlled by a sleeve valve 26 formed with a pair of inlet ports 27 to register with the inlet port 24 and with an exhaust port 28 to register with the port 25.

In order that the ring gear 13 may align itself with the planet gears and sun gear, it is mounted for axially floating movement relative to the fly wheel and the cover plate 21. For this purpose the cover plate is connected to the fly wheel by studs 29 which slidably engage and support the ring gear. With this construction the ring gear may move axially and is held in alignment with the planet gears by the side plates 16 and 17, without undue side thrust.

In order that the unit may function to transmit torque at an increased ratio, the sun gear is adapted to be held against reverse rotation by a one-way brake 31 interposed between a sleeve 22 and a fixed part of the housing.

The planetary gear set as descried above is adapted to drive a second similar planetary gear set including a sun gear 32 mounted on the shaft 23 and meshing with planet pinions 33 which in turn mesh with a ring gear 34. The planet pinions are carried between plates 35 and 36 which seal against the sides of the gear teeth and which are formed with inlet passages 37 communicating with an inlet port 38 in the shaft 23 and with exhaust ports 39 communicating with an exhaust passage 41 in a tubular shaft 42. The sleeve valve 26 is formed with an inlet port 43 adapted to register with the inlet port 38 and with an elongated exhaust port 44 adapted to register with the port 41. The valve 26 may be controlled by a collar 45 connected thereto by a pin 46 extending through a slot in the shaft 42. The shaft 42 as shown, is connected to the planet carrier formed by plates 35 and 36.

The ring gear 34 is connected to a pair of plates 47 and 48 which are formed in register with the ring gear with sets of clutch teeth 49. The ring gear is formed on its opposite ends with similar clutch teeth adapted to engage the teeth 49 and having sufficient clearance that the ring gear may float axially to align itself with the planet pinions and sun gear. The plates 47 and 48 and the ring gear are held against reverse rotation by a one-way brake 51 acting between a tubular hub on one of the plates and a fixed part of the housing.

Figure 4:
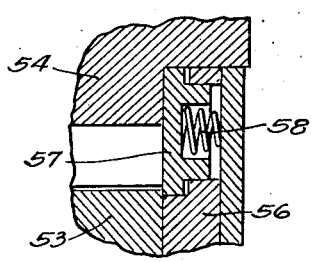
Figure 4 is a partial enlarged section on the line 4—4 of Figure 2.

The second planetary gear set is adapted to drive through a third planetary gear set including a sun gear 52 mounted on the shaft 42 and meshing with planet pinions 53 which in turn mesh with a ring gear 54. The planet pinions are carried between plates 55 and 56 which fit tightly against the sides of the planet pinions and sun gear and which are relieved opposite the ring gear teeth. In order to seal the ring gear teeth against leakage of fluid past their sides while permitting axial movement between the ring gear and planet pinions yieldingly sealing means are provided to engage the ring gear teeth. As best seen in Figures 2 and 4 such means comprise buttons 57 carried by the side plates and urged against the ring gear teeth by springs 58. The buttons are located at the points where the planet pinions mesh with the ring gear and seal the sides of the ring gear teeth against fluid leakage so that an effective pump unit may be formed.

The side plate 56 is formed with inlet passages 59 as best seen in Figure 2 which communicate with the gear teeth adjacent the points where the planet pinions mesh with the sun and ring gears respectively. The spaces between the gears are closed by block members 61 which fit tightly against the ends of the teeth on the several gears so that an effective pump unit is formed. It will be noted that each planet pinion has two inlet ports at diametrically opposite points thereon and it will be understood that exhaust ports are provided in the opposite side plate 55 at diametrically opposite points with respect to the planet pinions and out of register with the inlet ports.

The inlet passage is provided with an inwardly opening check valve 62 communicating with an inlet passage 63 extending through the shaft 42. The space around the gear set is connected through an exhaust passage 64 with the interior of the shaft 42. Preferably a second exhaust passage 65 is provided opening into a hollow space in the sun gear 52 which communicates with the inlet passage.

The passages 63, 64 and 65 are controlled by valve sleeve 66 slidable in the shaft 42 and in a tubular output shaft 67 which is connected to the ring gear 54. The valve 66 may be controlled by a shifting collar 68 connected to the valve by a pin through a slot in the shaft 67.

The third planetary gear set is adapted to form a reverse gear for the transmission and for this purpose a friction brake 69 is provided engageable with a brake drum 71 which is connected to the planet carrier. The brake is adapted to be controlled by a lever 72 and is normally disengaged being engaged only when reverse drive is desired.

The transmission is adapted to be controlled manually or automatically by the control mechanism illustrated diagrammatically in Figure 5. As shown in this figure, a cylinder 73 is mounted adjacent the transmission and slidably carries a piston whose piston rod 74 is connected to the brake control lever 72 and to a shifting lever 75 pivoted at 76 and connected at its opposite end to the shift collar 68 for the valve 66. A similar cylinder 77 is provided having its piston rod 78 connected to one end of a shift lever 79 which is pivoted at 81 and has its opposite end connected to the shift collar 45 for the valve 26. The cylinder 73 is provided with three valves 82, 83 and 84 which may connect the cylinder at spaced points along its length to a source of power such as the intake manifold of an internal combustion engine. When any one of the valves is open the piston in the cylinder will be moved to a position in which it closes the port for that valve and will remain in that position until one of the other valves is open. The cylinder 77 is provided with four similarly operating valves 85, 86, 87 and 88 so that its piston may be moved to any one of four different positions.

Figure 3:
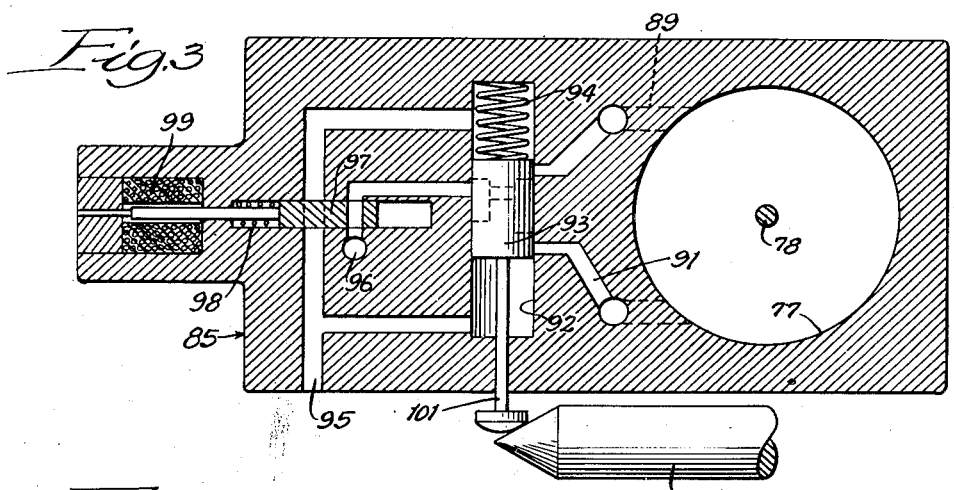
Figure 3 is an enlarged section illustrating the details of a control valve.

Each of the valves 82 to 88 may be constructed as shown in Figure 3. This figure illustrates by way of example the valve 85, but it will be understood that each of the other valves is identical in construction. As shown in Figure 3, the cylinder 77 is connected through axially spaced ports 89 and 91 with spaced points in a valve compartment 92 in the valve body. A valve 93 is slidably mounted in the bore and is urged downward therein by a coil spring 94. The ends of the bore 92 are connected to an atmospheric port 95 and its central portion is connected to a source of vacuum through a passage 96. The passage 96 is controlled by a slide valve 97 normally closed by a spring 98 and adapted to be opened by a solenoid 99.

The valve 93 is connected to a rod 101 projecting through the valve body and adapted to be engaged by the pointed end of an operating rod 102. The rod 102 as best seen in Figure 5 is connected to a bracket 103 on the piston rod 78 to be moved by the piston.

The solenoids 99 of the valves 85 to 88 are controlled by a switch mechanism 104 having a series of contacts thereon adapted to be selectively engaged by a wiper 105. The contacts are connected respectively to the solenoids 99 of the valves so that the position of the wiper 105 determines which of the solenoids will be energized.

When the solenoid of one of the valves is energized and unless the operating rod 102 is in the position shown in Figure 3 with respect to such valve, vacuum will be admitted to the port 91 causing the piston in the cylinder 77 to move toward the predetermined point. The ducts 89 and 91 communicate with the right and left end of cylinder 77. When the piston reaches the desired position, the operation rod 102 will engage the valve stem 101 and move the valve 93 to its neutral position as shown in Figure 3. In this position the valve closes both ports 89 and 91. If the piston should move in either direction, however, one or the other of the ports 89 and 91 will be opened to connect one side or the other of the piston to vacuum and return the piston to the desired position. In this way, the position of the piston in the cylinder 77 is accurately determined when both ports 89 and 91 are closed.

The valves 97 are adapted to be controlled automatically in response to speed and torque and for this purpose the switch mechanism 104 is provided with an automatic contact 106 connected through a wire 107 to each of a plurality of switch contacts 108. The contacts 108 have contacts 109 paired therewith and the pairs are adapted to be bridged by switch members 111. When the switch members are in their upper position to which they may be urged by springs or the like, each of the pairs of contacts 108 and 109 will be interconnected.

Below the contacts 108 and 109 are another series of contacts 112 and 113. The first contact 112 as seen at the left in Figure 5 is connected to the wire 107 and each of the succeeding contacts 112 is connected to the preceding contact 109. The contacts 113 are connected respectively to the wires leading to the valves 88, 87, and 86 and the last contact 109 is connected to the wire leading to the valve 85.

The switch members 111 are adapted to be depressed into engagement with the contacts 112 and 113 by operating rods 114. The operating rods are engaged by a cam rod 115 terminating in a pointed cam end and connected to a piston 116 in a cylinder 117. A compression spring 118 urges the piston 116 to the right out of engagement with all of the operating rods 114. Preferably a spring detent 119 is provided engageable with notches in the rod 115 yieldingly to hold it in any one of its several operating positions.

The piston 116 is urged to the left automatically to control the transmission in response to both speed and torque by a mechanism similar to that more particularly described and claimed in my copending application, Serial No. 416,319, filed on October 24, 1941, Patent #2,372,817. This mechanism as shown, comprises a pump 121 which may be a gear pump and which is driven by one of the elements of the transmission mechanism, preferably the driven shaft. The pump sucks liquid such as oil from a supply tank 122 and forces it through a pipe 123 connected to the right end of a cylinder 117. A return conduit 124 is preferably connected to the left end of the cylinder to return any fluid leaking past the piston to the tank 122. Pressure in the pipe 123 is limited by a safety relief valve 125 and by an automatic control valve indicated generally at 126.

The control valve 126 includes a valve body having a pair of pressure relief valves 127 and 128 therein connected in parallel to the pipe 123 for controlling communication between this pipe and a return conduit 129 leading back to the supply tank. The valve 128 is the main control valve and is urged against its seat by springs 131 and 132. The spring 131 seats on a cam 133 which is connected through a link 134 to a manual selector 135 through which the cam may be adjusted. By turning the selector handle 135 the tension of the spring 131 may be adjusted to vary the point at which the valve 128 will open.

The spring 132 seats against a similar cam 136 connected through a link 137 to a cam follower arm 138 engaging a cam 139 which is connected to the accelerator pedal 141. The cam 139 may be of substantially uniform descent throughout most of its operating surface as shown and may terminate in an abrupt shoulder 142. When the accelerator pedal is fully depressed the cam follower will fall over the shoulder to release the pressure on the spring 132 thereby causing the transmission to shift into a higher torque ratio or lower speed ratio. This feature is advantageous when it is desired to accelerate rapidly.

The valve 127 is controlled by a Sylphon 143 which is responsive to temperature. When the oil used in the control system is cold and more viscous than normal the Sylphon 143 will relieve the pressure on valve 127 to compensate for the viscosity of the oil so that the transmission will be controlled in the same manner regardless of temperature. After the mechanism is warmed up the Sylphon will increase pressure on valve 127, leaving the transmission more under control of valve 128. Since the pump 121 is driven at a speed proportional to the speed of one of the transmission elements the volume of liquid it delivers will be proportional to speed and the pressure built up across the valve 128 will be greater at high than at low speeds. Accordingly, the pressure supplied to the cylinder 117 will vary with speed. The cam 139 may load the spring 132 variably depending upon the accelerator position so that the control is affected by both speed and accelerator position. Accelerator position coupled with speed is approximately equal to torque and the control is therefore both speed and torque responsive.

It is normally preferred to have the shifting mechanism operate more rapidly at high speed than at low speed and for this purpose a throttling valve 144 may be provided connected to the accelerator pedal 141 and controlling flow through a vacuum line 145. The line 145 may supply vacuum to both cylinders 73 and 77 so that when the accelerator pedal is depressed, the valve 144 will be opened further to reduce the restriction in line 145 to provide a more rapid movement of the pistons in these cylinders.

The valves 82, 83, 84 of the cylinder 73 may be controlled manually through a selector valve 146 having a large segment 147 and a pair of buttons 148 and 149 thereon adapted to be engaged by a wiper 151. Preferably the wipers 151 and 105 are interconnected by an insulated coupling 104ᵃ for simultaneous movement. The segment 147 is connected to the valve 84 to shift the piston rod 74 to a position for forward drive while the buttons 148 and 149 are connected to valves 83 and 82 respectively to shift the transmission to a position for neutral and reverse drive.

For shifting the transmission to neutral the wiper 151 is moved into engagement with the contact button 148 to energize the valve 83 and move the piston rod 74 to its neutral position. At this time, the wiper 105 is in engagement with one of the dummy buttons on the switch 104 and none of the valves 85 to 88 can be opened. Under these conditions the valve 26 is shifted to the extreme right to open the exhaust ports 25 and 41 and close the intake ports 24 and 38. The valve 66 is shifted to its central position to close the intake port 63 and open the ports 64 and 65. The brake 69 is disengaged so that the third gear unit is free to turn in either direction without transmitting any torque. It will be noted that when the vehicle is moved forward, liquid may be drawn in the port 65 to the inlet passage and forced out the port 64 while if the vehicle is moved rearwardly, the reverse flow will occur. However, no substantial torque can be transmitted since the liquid will be pumped freely through the unit.

In order to eliminate creep under these conditions, the driven shaft 67 may carry a brake drum 152 adapted to be engaged by a brake band 153 to hold the driven shaft stationary. The brake band 153 may be controlled by a side-ways movement of the accelerator pedal 141 as more particularly disclosed in my Patent No. 2,309,051.

This brake arrangement may provide a highly satisfactory no-back, by constructing the brake band 153 so that it has a substantial wrapping action in reverse and a relatively lighter braking effect in forward drive. When the accelerator pedal is returned to its central position and depressed to start the car in motion, the brake 153 will be released. For reverse drive, the wipers 151 and 105 are turned to engage the wiper 151 with the contact button 149, the wiper 105 at this time engaging the second dummy button on the switch 104. The button 149 is connected to the valve 82 to energize it and move the piston rod 74 to its extreme left position. This operation moves the brake operating lever 72 counterclockwise to engage the brake 69 and shifts the valve 66 to its extreme righthand position. In this position, the ports 64 and 65 remain open and the planet carrier formed by the plates 55 and 56 is held stationary. Torque is transmitted from the driving shaft through the first two planetary gear sets which transmit the torque at a reduced speed in the forward direction. Thus the shaft 42 is driven forward to drive the sun gear 52 forward and since the planet carrier of the third gear set is held stationary, the direction of drive is reversed to drive the ring gear 54 and the driven shaft 67 backward.

For forward drive at low speed, the wipers 151 and 105 may be moved to engage the wiper 151 with segment 147 and the wiper 105 with the first of the buttons connected to the valves 85 to 88. The circuit from the segment 147 opens the valve 84 moving the piston rod 74 to its extreme righthand position. This operation disengages the brake 69 and shifts the valve 66 to its extreme left position as shown in Figure 1 in which the inlet port 63 is open and the ports 64 and 65 are closed. Under these conditions, fluid is admitted to the gear unit but the exhaust is shut off so that the gear unit is locked to function as a clutch. The wiper 105 energizes the valve 85 to open it and shift the piston rod 78 to its extreme left position moving the valve 26 to its extreme right position in which inlet ports 38 and 24 are closed and exhaust ports 41 and 25 are open. Under these conditions the first two gear sets function as reduction gears to increase the torque of the driving shaft and transmit it directly through the third gear set to the driven shaft.

Second speed forward is provided by moving the wiper 105 to the second button to open the valve 86 and shift the piston rod 78 to the right to move the valve 26 to its second position. In this position, the inlet port 38 is closed and outlet port 41 is open so that the second gear set continues to operate as a reduction gear. The inlet port 24 of the first gear set is open and its exhaust port 25 is closed so that this gear set functions as a clutch to transmit torque directly from the driving shaft to the shaft 23. Under these conditions only the second gear set operates to increase the torque and the speed of the driven shaft will be higher than in the first position described.

For third speed forward, the wiper 105 is moved to energize the valve 87 shifting the piston rod 78 further to the right and the valve 26 to its third position. At this time, the inlet port 38 is open and the exhaust port 41 is closed so that the second gear set operates as a clutch. The inlet port 24 is closed and the exhaust port 25 is open so that the first gear set operates as a reduction gear. It will be noted that the sun is the reaction member in the first and the ring gear in the second gear sets so that this position provides a different degree of torque multiplication than the second position described.

For direct drive the wiper 105 is moved to the position shown in Figure 5 to open the valve 88 and shift the valve 26 to the position shown in Figure 1. In this position, both inlet ports 24 and 38 are open and both exhaust ports 25 and 41 are closed so that all three of the gear sets function as clutches to transmit torque direct from the driving shaft to the driven shaft.

For automatic forward operation, the wiper 105 is moved into engagement with the contact button 106 to connect the wire 107 in the circuit. With the piston 116 at the extreme right, all of the plungers 114 will be raised and a circuit will be energized from the righthand contact 108 to the righthand contact 109 to open the valve 85. Upon an increase in pressure in the cylinder 117 in response to increased speed or decreased torque conditions or both, the piston 116 will be moved to the left to cam the righthand plunger 114 down and close the righthand switch member 111 across the contacts 112 and 113. At this time a circuit will be established to the valve 86 from the middle contact 108 to the middle contact 109 which is connected to the righthand contact 112. The righthand switch member 111 connects this last contact to the righthand contact 113 which is connected to the valve 86. Further movement of the piston 116 to the right will successively move down the remaining plungers 114 to energize the valves 87 and 88 and shift the transmission to its third and fourth positions described above.

It will be understood that during all forward operations the wiper 151 remains in contact with the segment 147 to shift the valve 66 to its forward position. The circuit through the valves 82 to 88 include a wire 155 which is connected to the wiper 105 and to a source of current such as a battery 156. The wiper 105 is connected to the battery through a switch controlled by the accelerator pedal. As shown, the switch includes an elongated segment 157 connected to the wire 155 engaged by an arm 158 which is connected to the battery and moved by the accelerator pedal. Throughout the normal operating range the wiper 158 remains in contact with the segment 157 to complete the circuits as described.

When the accelerator pedal is released to close the engine throttle and reduce the engine to a condition of minimum torque, the wiper 158 will leave the segment 157 and engage a contact 159 connected to the neutral valve 83. Thus when the accelerator pedal is released, the valve 83 will be opened to shift the transmission to neutral.

In order to make this control ineffective at high speeds when engine braking is desirable, a switch 161 is connected between the contact 159 and the valve 83 controlled by a governor 162 which is responsive to the speed of one of the shafts, preferably the driven shaft. When the driven shaft is operating above a predetermined speed the switch 161 will be opened to prevent shifting of the transmission into neutral so that engine braking may be utilized at high speeds.

As previously stated, the third gear set having ring gear 54, acts as the master clutch for all forward clutching operations. The band brake 69 performs the functions of a brake for reverse movement in cooperation with this gear set.

These two operations are controlled by the accelerator pedal, by means of an electric circuit and a cylinder as previously described. The accelerator pedal preferably has lost motion at both the top and bottom of its travel. By depressing the accelerator pedal thru the lost motion at the top of its stroke wiper 158 is caused to leave contact 159 and engage contact 157. This pedal movement also simultaneously opens the accelerator a small predetermined amount. The contact just made causes piston to move and engage one of the clutch functioning members, depending on the position of the circuit controls previously described. If the pedal is depressed gradually the vacuum throttle valve 144 will open slowly thereby controlling the rate of clutch engagement as well as the rate of increasing engine power. By these means the clutch is caused to engage, slowly or quickly, after the pre-selections are made by operating contacts 147—148 or 149 as more fully described previously.

As the pedal 144 is depressed the cam 139 decreases the tension on spring 132 in the fluid control valve, thus decreasing fluid pressure on piston 116 for a given car speed. A depressed accelerator pedal thereby maintains a lower speed ratio for a given intermediate car speed. By depressing the pedal beyond full open throttle position the tension on spring 132 is further decreased thus further reducing the fluid pressure on piston 116 and causing a shift to a lower speed ratio at car speed below some predetermined high car speed.

Referring to Figure 1, check valve 62 is provided to prevent free wheeling when in the forward driving position. Valves and/or one way clutches may be used in connection with the first and second gear sets; not shown herein, but shown and described fully in my copending application No. 494,291 filed July 12, 1943, Patent #2,371,229, to prevent free wheeling.

While one embodiment of the invention has been shown and described in detail herein, it will be understood that this is illustrative only and is not intended as a definition of the scope of the invention, reference being had for that purpose to the appended claims.

What is claimed is:

1. In a torque transmitting mechanism, a torque transmitting unit comprising a planetary differential gear set including a sun gear, a series of planet pinions meshing with the sun gear, and a ring gear meshing with the planet pinions, a gear carrier carrying the planet pinions including side plates overlying the ends of the teeth on the sun and ring gears, means between the plates engaging the ends of the gear teeth whereby the gear set forms a fluid pump, means forming inlet and outlet ports for the pump, valve means controlling the inlet and outlet ports, a supporting member adjacent the gear set, elongated pins carried by the supporting member and slidably connected to the ring gear whereby it can align itself with the gear carrier, and torque transmitting connections to the sun gear, the gear carrier and the supporting means.

2. In a torque transmitting mechanism, a torque transmitting unit comprising a planetary differential gear set including a sun gear, a series of planet pinions meshing with the sun gear, and a ring gear meshing with the planet pinions, a gear carrier carrying the planet pinions including side plates overlying the ends of the teeth on the sun and ring gears, means between the plates engaging the ends of the gear teeth whereby the gear set forms a fluid pump, means forming inlet and outlet ports for the pump, valve means controlling the inlet and outlet ports, supporting members on opposite sides of the gear set, axially slidable clutch teeth on the supporting members and the ring gear drivably to connect them while permitting the ring gear to move axially, and torque transmitting connections to the sun gear, the gear carrier and the supporting members.

3. In a torque transmitting mechanism, a torque transmitting unit comprising a planetary differential gear set including a sun gear, a series of planet pinions meshing with the sun gear, and a ring gear meshing with the planet pinions, a gear carrier carrying the planet pinions including side plates overlying the ends of the teeth on the sun and ring gears, means between the plates engaging the ends of the gear teeth whereby the gear set forms a fluid pump, means forming inlet and outlet ports for the pump, valve means controlling the inlet and outlet ports, the side plates being relieved opposite the ring gear teeth whereby the ring gear and planet pinions can move axially relative to each other, yielding sealing means carried by the side plates and sealingly engaging the sides of the ring gear teeth, and torque transmitting connections to the sun gear, gear carrier and ring gear.

4. In a torque transmitting mechanism, a torque transmitting unit comprising a planetary differential gear set including a sun gear, a series of planet pinions meshing with the sun gear, and a ring gear meshing with the planet pinions, a gear carrier carrying the planet pinions including side plates overlying the ends of the teeth on the sun and ring gears, means between the plates engaging the ends of the gear teeth whereby the gear set forms a fluid pump, means forming inlet and outlet ports for the pump, valve means controlling the inlet and outlet ports, the side plates being relieved opposite the ring gear teeth whereby the ring gear and planet pinions can move axially relative to each other, sealing buttons of relatively small diameter carried by the side plates and yieldingly pressing against the sides of the ring gear teeth, and torque transmitting connections to the sun gear, the gear carrier and the ring gear.

5. A torque transmitting mechanism comprising a plurality of planetary gear sets, means enclosing the gears of said gear sets and providing inlet and outlet ports therefor whereby they form fluid pumps, shiftable valve means controlling the inlet and outlet of fluid to the gear sets, a brake engageable with an element of one of the gear sets to reverse the drive therethrough, power means to operate the brake and to shift the valve means, and means responsive to the speed of the driving member of the mechanism to control the power means which operates the valve means.

6. A torque transmitting mechanism comprising a plurality of planetary gear sets, means enclosing the gears of said gear sets and providing inlet and outlet ports therefor whereby they form fluid pumps, shiftable valve means controlling the inlet and outlet of fluid to the gear sets, a pump driven by one element of the mechanism to create a fluid pressure proportional to the speed of the mechanism, and means responsive to said fluid pressure to control shifting of the valve means.

7. A torque transmitting mechanism comprising a plurality of planetary gear sets, means enclosing the gears of said gear sets and providing inlet and outlet ports therefor whereby they form fluid pumps, shiftable valve means controlling the inlet and outlet of fluid to the gear sets, a pump driven by one element of the mechanism to create a fluid pressure proportional to the speed of the mechanism, power means to shift the valve means, and means responsive to said fluid pressure to control shifting of the power means to any one of a plurality of positions.

8. A torque transmitting mechanism comprising a plurality of planetary gear sets, means enclosing the gears of said gear sets and providing inlet and outlet ports therefor whereby they form fluid pumps, shiftable valve means controlling the inlet and outlet of fluid to the gear sets, a pump driven by one element of the mechanism to create a fluid pressure proportional to the speed of the mechanism, a cylinder, a piston in the cylinder connected to the valve means to move it, a series of valves connected to the cylinder at axially spaced points to control connection of the cylinder to a source of power, and means responsive to said fluid pressure to control said valves.

9. A torque transmitting mechanism comprising a plurality of planetary gear sets, means enclosing the gears of said gear sets and providing inlet and outlet ports therefor whereby they form fluid pumps, shiftable valve means controlling the inlet and outlet of fluid to the gear sets, a brake engageable with one element of one of the gear sets to reverse the drive therethrough, power means to operate the brake and shift the valve means, manual control means to simultaneously control the power means to provide neutral or reverse or forward drive, and means responsive to the speed of one member of the transmission to control the power means which operates the valve means for automatic forward drive.

10. A torque transmitting mechanism comprising a plurality of planetary gear sets, means enclosing the gears of said gear sets and providing inlet and outlet ports therefor whereby they form fluid pumps, shiftable valve means controlling the inlet and outlet of fluid to the gear sets, a brake engageable with an element of one of the gear sets to reverse the drive therethrough, a pair of cylinders, pistons in the cylinders connected respectively to the brake and the valve means, valves connected to the cylinders at axially spaced points to control communication thereof with a source of power, and electrical means to control the valves.

11. In a torque transmitting mechanism, a torque transmitting unit comprising a planetary gear set, means enclosing the gears of the gear set and providing inlet and exhaust ports therefor whereby it forms a fluid pump, a valve controlling the ports, means to shift the valve to one position in which the inlet port is closed and the exhaust port open and to a second position in which the inlet port is open and the exhaust port closed, a control member for controlling the power supplied to the mechanism, and means operated by the control member when it is in a minimum power supply position to operate the valve shifting means to shift the valve to said one position.

12. In a torque transmitting mechanism, a torque transmitting unit comprising a planetary gear set, means enclosing the gears of the gear set and providing inlet and exhaust ports therefor whereby it forms a fluid pump, a valve controlling the ports, means to shift the valve to one position in which the inlet port is closed and the exhaust port open and to a second position in which the inlet port is open and the exhaust port closed, a control member for controlling the power supplied to the mechanism, means operated by the control member when it is in a minimum power supply position to operate the valve shifting means to shift the valve to said one position, and means responsive to the speed of one element of the mechanism to make the last named means inoperative when the speed is above a predetermined value.

13. In a torque transmitting mechanism a planetary gear set including a sun gear, a ring gear and a planet carrier carrying planet pinions meshing with the sun and ring gears, a brake to hold the planet carrier against rotation for reverse drive, means enclosing the gears of the gear set and providing inlet and exhaust ports therefor whereby it forms a fluid pump, valve means controlling said ports and controlling the gear set to form a clutch for forward drive and a check valve to prevent reverse flow of fluid through the inlet port to prevent overrunning of the gears.

ADIEL Y. DODGE.